United States Patent
Sheu

[11] Patent Number: 6,027,800
[45] Date of Patent: Feb. 22, 2000

[54] HIGH IMPACT RESISTANT, HIGH GLOSS, AND HIGH ENVIRONMENTAL STRESS CRACK RESISTANT THERMOPLASTIC MANUFACTURED ARTICLES

[75] Inventor: Hrong-Roang Sheu, Northville, Mich.

[73] Assignee: BASF Corporation, Mt. Olive, N.J.

[21] Appl. No.: 08/994,411

[22] Filed: Dec. 19, 1997

[51] Int. Cl.[7] .............................. B32B 5/16; B32B 27/08
[52] U.S. Cl. ......................... 428/327; 428/340; 428/518; 525/96
[58] Field of Search .................................. 428/327, 340, 428/518; 525/96

[56] References Cited

U.S. PATENT DOCUMENTS

| | | |
|---|---|---|
| 2,993,882 | 7/1961 | Ashby et al. . |
| 3,380,978 | 4/1968 | Ryan et al. . |
| 3,810,957 | 5/1974 | Lunk . |
| 3,998,914 | 12/1976 | Lillis et al. . |
| 4,031,166 | 6/1977 | Bronstert et al. . |
| 4,188,432 | 2/1980 | Holden et al. . |
| 4,377,658 | 3/1983 | Collins . |
| 4,386,187 | 5/1983 | Grancio et al. ............................ 525/96 |
| 4,386,188 | 5/1983 | Grancio et al. ............................ 252/96 |
| 4,493,922 | 1/1985 | Echte et al. . |
| 4,548,988 | 10/1985 | Castelein . |
| 4,556,691 | 12/1985 | Castelein . |
| 4,560,727 | 12/1985 | Crossan . |
| 4,939,207 | 7/1990 | Fasulo et al. . |
| 5,106,696 | 4/1992 | Chundury et al. . |
| 5,290,837 | 3/1994 | Ghidoni et al. . |
| 5,321,081 | 6/1994 | Chundury et al. . |
| 5,330,808 | 7/1994 | Duff et al. . |
| 5,334,657 | 8/1994 | Swartzmiller et al. ................... 525/71 |
| 5,460,818 | 10/1995 | Park et al. . |
| 5,532,315 | 7/1996 | Bonekamp et al. ....................... 525/71 |
| 5,543,461 | 8/1996 | Nke-Aka et al. . |
| 5,589,555 | 12/1996 | Zboril et al. . |
| 5,658,625 | 8/1997 | Bradfute et al. ......................... 428/34.9 |
| 5,717,029 | 2/1998 | Bonekamp et al. ....................... 525/98 |
| 5,756,579 | 5/1998 | Fornasari et al. ......................... 525/99 |
| 5,852,124 | 12/1998 | Wang et al. ............................. 525/316 |

FOREIGN PATENT DOCUMENTS

WO96/17016  6/1996  WIPO .

*Primary Examiner*—Hoa T. Le
*Attorney, Agent, or Firm*—Mark A. Frentrup

[57] ABSTRACT

Thermoplastic manufactured articles are provided which exhibit an advantageous combination of high gloss and high environmental stress crack resistance, made from a polymeric composition comprising:

(a) high impact polystyrene having a gloss at 60 degrees of greater than 85% and an impact resistance of greater than 0.7 ft-lb/inch;

(b) high density polyethylene which has a density greater than or equal to about 0.94 g/cm$^3$, and which has a stress exponent less than or equal to about 1.70; and (c) a compatibilizing polymer for components (a) and (b), selected from the group consisting of diblock styrene butadiene copolymers, triblock styrene butadiene copolymers, diblock styrene isoprene copolymers, triblock styrene isoprene copolymers, and mixtures thereof, wherein the gloss at 60 degrees of the composition is greater than or equal to about 85%, and the environmental stress crack resistance measured in minutes until breakage at 1000 psi is greater than about 60.

43 Claims, 1 Drawing Sheet

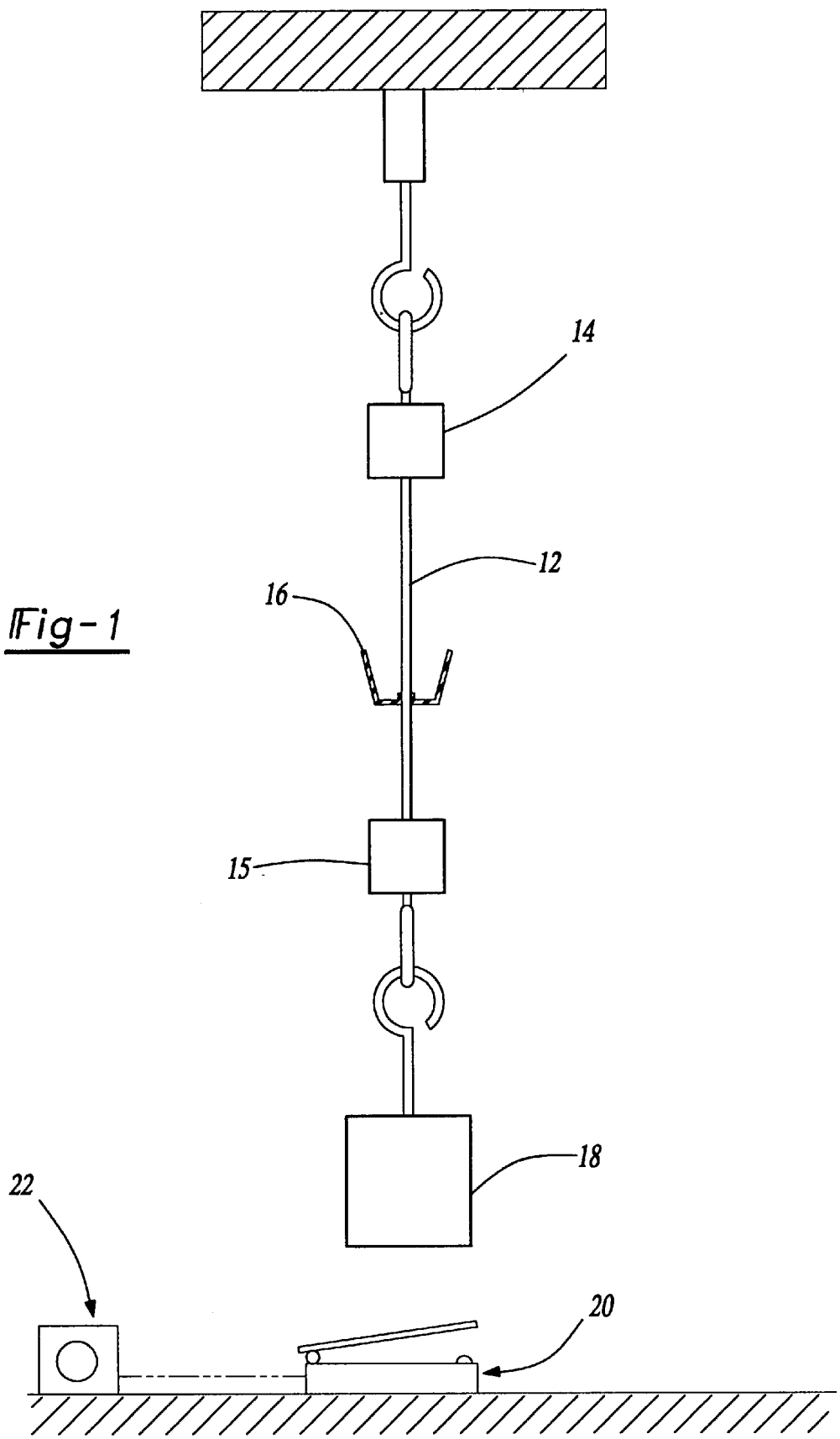

HIGH IMPACT RESISTANT, HIGH GLOSS, AND HIGH ENVIRONMENTAL STRESS CRACK RESISTANT THERMOPLASTIC MANUFACTURED ARTICLES

The present invention relates to polymeric compositions exhibiting a combination of high gloss and high environmental stress crack resistance, especially high impact polystyrene compositions. More particularly, the invention relates to high impact polystyrene compositions containing rubber modified vinyl aromatic polymers and certain particular polyolefins, to molded and thermoformed articles made from such compositions, and methods for their production. Furthermore, the invention relates to composites with a gloss cap layer made from the polymeric compositions, and methods for their manufacture.

BACKGROUND

It is well known to make high gloss compositions from rubber modified vinyl aromatic polymers, such as for example high impact polystyrene. A drawback of such compositions, however, is that they are very susceptible to stress cracking when exposed to environmental oils, fats, detergents, or cleaners. Thus the known compositions are deficient in the property of environmental stress crack resistance, even though they have good gloss properties.

The environmental stress crack resistance of such compositions has been addressed in the prior art. For example, in U.S. Pat. No. 5,543,461, the environmental stress crack resistance of impact modified styrenic polymers was increased by increasing the particle size of the impact modifier, and in U.S. Pat. No. 4,144,204, high impact polystyrene compositions with increased environmental stress crack resistance were produced wherein the rubber particles had a diameter of at least 4 microns. In U.S. Pat. No. 4,939,207, blends of a vinyl aromatic polymer, a polyolefin, and a vinyl aromatic monomer conjugated diene star block copolymer were provided which had good chemical resistance. However, in all of the above prior art examples, the high gloss properties of the resulting compositions are lost.

As a result, the known compositions do not provide high impact polystyrene compositions exhibiting a combination of both high gloss and desirable environmental stress crack resistance. Such compositions would be particularly advantageous for thermoforming or sheet extrusion as a gloss cap layer on co-extruded sheet for food packaging or refrigerator liner applications, or for example as molded articles such as telephone handsets subject to attack by the natural oils in the skin.

SUMMARY OF THE INVENTION

According to the invention, there is now provided a polymeric composition exhibiting a combination of high gloss and high environmental stress crack resistance, comprising (a) a high gloss rubber modified vinyl aromatic polymer; and (b) a polyolefin that has a stress exponent less than 1.70, wherein the gloss at 60 degrees of the composition is greater than about 85%, and the environmental stress crack resistance measured in minutes until breakage at 1000 psi is more than about 60.

Surprisingly, it has been found that when a particular polyolefin (b) having a stress component of less than 1.7 is used, the resulting composition has an advantageous combination of high gloss and a desirable level of stress crack resistance.

Advantageously, the polymer composition further comprises a compatibilizing polymer (c).

In another embodiment, the polymer composition further comprises a low gloss polymer (d).

The invention also provides molded thermoplastic articles made from the above polymeric composition.

In addition, there is provided an extruded thermoplastic sheet from the above composition, as well as thermoformed articles made from the sheet.

Furthermore, there is provided a multilayer thermoplastic composite comprising a substrate layer and a gloss cap layer made from the above polymeric composition.

In addition, there are provided methods of making the articles, sheets, and composites mentioned above.

DESCRIPTION OF THE DRAWINGS

FIG. 1 is a diagram of the melt index strand ESCR apparatus used to measure the environmental stress crack resistance.

DETAILED DESCRIPTION OF THE INVENTION

The composition of the invention includes a high gloss rubber modified vinyl aromatic polymer (a), a polyolefin (b) having a stress component of less than 1.70, and a compatibilizing polymer (c). The particular aspects of each will now be discussed in detail.

(a) High Gloss Rubber Modified Vinyl Aromatic Polymer

The rubber modified vinyl aromatic polymers of the invention comprise a polymer matrix in which are dispersed particles of elastomeric polymers. They are characterized by having a surface gloss at 60 degrees of greater than 85%, preferably of greater than 90%. The impact resistance of the rubber modified vinyl aromatic polymers of the invention will generally be greater than 0.7 ft-lb/inch, measured by the notched Izod impact test. Preferably, the impact resistance will be greater than 1.2 ft-lb/inch, and more preferably greater than 2 ft-lb/inch. A preferred polymer matrix comprises polystyrene. Such compositions are typically described as high impact polystyrene, or HIPS.

More generally, suitable rubber modified vinyl aromatic polymers include rubber modified homopolymers of $C_6$–$C_{20}$ vinyl aromatic monomers, rubber modified copolymers of two or more such monomers and rubber modified copolymers of one or more such monomers with up to 25 weight percent of a copolymerizable comonomer other than a vinyl aromatic monomer. Examples of suitable vinyl aromatic monomers are styrene, vinyl toluene, .alpha.-methyl styrene, t-butyl styrene, and chlorostyrene. Examples of suitable copolymerizable comonomers other than a vinyl aromatic monomer are N-phenyl maleimide, acrylamide, maleic anhydride, acrylic acid, n-butyl acrylate, and methyl methacrylate.

Suitable elastomeric polymers used to modify the impact properties of the foregoing vinyl aromatic polymers are those having $T_g$ less than 0 degrees C., preferably less than –20 C. Examples of suitable elastomeric polymers are homopolymers of $C_4$–$C_6$ 1,3-dienes, especially butadiene or isoprene; copolymers of one or more vinyl aromatic monomers and one or more $C_4$–$C_6$ 1,3-dienes, especially butadiene or isoprene; copolymers of ethylene and propylene or of ethylene, propylene and a nonconjugated diene, especially 1,6-hexadiene or ethylidene norbornene; homopolymers of $C_4$–$C_6$ alkyl acrylates; copolymers of $C_4$–$C_6$ alkyl acrylates and a copolymerizable comonomer, especially a vinyl aromatic monomer or a $C_1$–$C_4$ alkyl methacrylate. Also included are graft polymers of the foregoing elastomeric polymers wherein the graft polymer is a vinyl aromatic polymer. A preferred vinyl aromatic monomer for use in all of the foregoing elastomeric polymers is styrene.

Preferred elastomeric polymers are based on 1,3-dienes, in that they are homopolymers or copolymers of one or more monomers which have a 1,3-conjugated diene structure. A most preferred elastomeric polymer is polybutadiene or a copolymer of styrene and butadiene, or a combination of such polymers. The above elastomeric polymers may be prepared by anionic solution polymerization techniques or by free radically initiated solution, mass, emulsion or suspension processes. The elastomeric polymers prepared by emulsion polymerization may be agglomerated to produce larger particles having a bimodal or trimodal, etc. particle size distribution if desired.

Rubber modified vinyl aromatic polymers are well known in the art and are commercially available. A highly preferred vinyl aromatic polymer is polystyrene and the impact modified polymer is high impact polystyrene. A very highly preferred, high impact polystyrene is prepared by the solution or mass polymerization technique and contains from 5 to 15 (more preferably from 6 to 9) weight percent polybutadiene rubber. Most highly preferred high impact polystyrenes are those wherein the polystyrene matrix has a weight average molecular weight $M_w$ from 100,000 to 300,000 (preferably from 120,000 to 240,000 and more preferably from 150,000 to 225,000), the molecular weights being determined by gel permeation chromatography employing a polystyrene standard.

Suitable rubber modified polymers are prepared by blending the elastomeric polymer with previously prepared matrix polymer having the desired chemical composition, by graft polymerizing the matrix in the presence of a predissolved elastomeric polymer, or by a combination of such techniques.

Preferred rubber modified vinyl aromatic polymers are prepared by dissolving the elastomeric polymer in the monomer or monomers, optionally in the presence of a solvent or diluent and polymerizing the resulting solution, desirably while agitating the solution so as to prepare a dispersed, grafted, impact modified polymer, having particles containing occlusions of matrix polymer dispersed throughout the resulting polymeric matrix. Such rubber modified polymers, known as mass or solution polymerized, high impact polymers, are previously well known in the art and are commercially available. Additional quantities of elastomeric polymer, especially emulsion grafted elastomeric polymers, may be blended into the rubber modified vinyl aromatic polymer if desired.

The dispersed particles of the elastomeric polymers noted above can be characterized as having an average diameter. As used herein, average diameter refers to a volume average diameter determined on a Horiba CAPA700 particle size analyzer. In general, as the average diameter of the dispersed particles decreases, the gloss of the resulting composition increases. In a particularly preferred embodiment of the invention, the rubber modified vinyl aromatic polymer comprises a polystyrene matrix in which are dispersed elastomeric polymer particles which have an average diameter of less than about 1.0 microns. Preferably, the average diameter is less than 0.8 microns, and more preferably less than about 0.6 microns. The diameter of the particles is preferably greater than about 0.1 microns, and more preferably greater than about 0.2 microns. A commercially available example is Polystyrene 525K, sold by BASF Corporation.

The dispersed elastomer polymer particles are characterized by a particle size distribution. The particle size distribution is often represented by a graph of the weight of particles present as a function of the average diameter of the particles. The weight of particles present can be expressed in either absolute units or in relative terms, and can represent either total weight or weight fraction. The terms monomodal, bimodal, and trimodal, etc. are used to describe graphs of particle size distribution which have one, two, and three, etc. separate peaks, respectively. The term multimodal is used as a general term for bimodal, trimodal, and higher terms. The peaks, or maxima, of the graphs correspond to average diameters of particles present in the composition.

Rubber modified vinyl aromatic polymers (a) of the current invention can have monomodal or multimodal particle size distributions. In a preferred multimodal distribution, a first maximum in the particle size distribution graph corresponds to particles of average diameter less than one micron, while a second maximum corresponds to particles of average diameter greater than one micron. More preferably, the second maximum corresponds to particles with an average diameter greater than 2 microns. In a preferred embodiment, the particle size represented by the second maximum is less than 10 microns, and more preferably it is less than 8 microns. The larger particles are present in lesser amount than the smaller particles. Preferably, the larger particles are present at less than 20%, based on the total weight of the particles. More preferably, they are present at less than 10%, and most preferably at less than about 6%. If the larger particles are present, they are preferably 1% or more of the total weight of particles, preferably greater than about 3%.

Rubber modified vinyl aromatic polymers (a) having multimodal particle size distributions can be prepared by polymerizing the vinyl aromatic monomers in the presence of elastomeric polymer particles which have the desired distribution, or else they can be prepared by blending or mixing together individual rubber modified vinyl aromatic polymers, each with monomodal distributions. An example of a bimodal distribution in a rubber modified vinyl aromatic polymer according to the invention is disclosed in U.S. Pat. No. 4,493,922, herein incorporated by reference.

(b) Polyolefin

The polyolefin of the invention is preferably a homopolymer or copolymer of ethylene. If it is a copolymer of ethylene, it is preferably a copolymer of ethylene with one or more other olefinic monomers having from 3 to 10 carbons, called $C_3$–$C_{10}$ monomers. Examples of $C_3$–$C_{10}$ monomers are olefins such as propylene, butene, hexene, octene, and decene. The $C_3$–$C_{10}$ monomers are generally present at up to about 20 weight percent, based on the total weight of olefin. Preferably, the $C_3$–$C_{10}$ monomers are present at a maximum of 10% by weight, and more preferably the maximum is 6% by weight. The $C_3$–$C_{10}$ monomers are present at a minimum of 1% by weight, and preferably at a minimum of 3% by weight.

In general, the polyolefins suitable for use in the invention have a stress exponent of less than about 1.70. Stress exponent is determined by measuring the throughput of a melt indexer at two stresses (2160 g and 6480 g loading) using the procedures of the ASTM melt index test method, and calculating the stress exponent according to the following formula:

Stress exponent=(1/0.477)×log (wt. extruded with 6480 g wt./wt. extruded with 2160 g wt.)

It is generally believed that stress exponent values of less than about 1.4 indicate a relatively narrow molecular weight distribution while values above about 1.7 indicate a relatively broad molecular weight distribution.

The stress exponent formula can be manipulated algebraically to a more readily interpretable form:

Stress exponent=1.00+(1/0.477)log(wt. extruded with 6480 g wt./3×wt. extruded with 2160 g wt.)

From this formula, one sees that when the weight extruded at the higher pressure is three times that extruded at the lower pressure, then the log term is equal to zero, and the stress exponent is 1.00. This corresponds to Newtonian flow—at 3 times the pressure, the flow is three times greater. Deviations from Newtonian flow will cause the amount extruded at the higher pressure to exceed the amount extruded at the lower pressure by a factor greater than the ratio of the higher pressure to the lower pressure. In that case, the stress exponent will be greater than 1.0, and will increase as the flow at the higher pressure increases.

It has been found that polyolefins having a stress exponent below an empirically determined cutoff point can be used in the present invention to provide compositions which have a combination of high gloss and a desirable environmental stress crack resistance. Thus, in general, polyolefins suitable for use in the invention will have a stress exponent less than about 1.70. The most preferred polyolefins have a stress exponent of less than about 1.30. Polyolefins with intermediate stress exponent values, such as 1.60, 1.50, and 1.40 will be generally preferred to polyolefins of stress exponent 1.70.

The density of the polyolefin can be chosen over a wide range. In general, densities between about 0.88 g/cm$^3$ and 0.96 g/cm$^3$ or higher may be selected, depending on the conditions of polymerization and the catalysts used. It is preferred that the density of the polyolefin be greater than 0.915 g/cM$^3$. More preferably, the density of the polyolefin is greater than 0.94 g/cm$^3$. Most preferably, the density is greater than 0.95 g/cm$^3$. It is believed that the higher the density of the polyolefin, the greater is its effect on increasing the environmental stress crack resistance of the resulting composition. Therefore, it is to be expected that if a relatively lower density in the preferred range is chosen, then relatively more polyolefin may be needed in the resulting composition to achieve the desired environmental stress crack resistance.

A particularly preferred polyolefin is high density polyethylene of density greater than 0.94 g/cm$^3$, preferably greater than 0.95 g/cm$^3$. These polyolefins are commercially available. Examples include Fortiflex® T-50-200 and Fortiflex® F-621S sold by Solvay Polymers, and Petrothene LT 6194-69 sold by Millennium Petrochemicals, Inc.

(c) Compatibilizing Polymer

The compatibilizing polymer (c) is an interfacial agent, believed to have the ability to improve the adhesion between the rubber modified vinyl aromatic polymer and the polyolefin. Suitable compatibilizing polymers are readily determined by preparing a mixture of components (a) and (b) and comparing the physical properties, especially the impact resistance and ductility, with a similar mixture containing the compatibilizing polymer.

Suitable compatibilizing polymers will generally produce an increase in both impact resistance and ductility. Preferably such increase in both properties is at least 10 percent, more preferably 20 percent. Desirably, such polymers are elastomers, that is, polymers having a $T_g$ less than 0 degrees C., preferably less than −20 C., having weight average molecular weights $M_w$ of from 10,000 to 150,000, more preferably from 20,000 to 100,000, and most preferably from 50,000 to 100,000 as determined by gel permeation chromatography using a polystyrene standard.

Preferred compatibilizing polymers are elastomeric polymers containing a vinyl aromatic monomer and a monomer other than a vinyl aromatic monomer, especially a $C_2$–$C_{18}$ .alpha.-olefin or conjugated or nonconjugated diene. Especially preferred are thermoplastic, elastomeric block copolymers of one or more vinyl aromatic monomers and one or more C4–$C_6$ conjugated dienes, wherein a preferred vinyl aromatic monomer is styrene, and preferred diene monomers include butadiene, isoprene, and mixtures thereof.

It has been found that elastomeric block copolymers having a styrene content of 25% or more are particularly suited as compatibilizing polymer (c). Preferably, the styrene content will be 35% or greater, and most preferably 40% or greater. All percentages are based on the weight of total monomer present in the elastomeric block copolymer.

Such block copolymers include A-B diblock copolymers, A-B-A triblock copolymers, multiblock, and star block copolymers whether tapered, partially tapered (that is, tapered between less than all blocks) or hydrogenated, and mixtures thereof. An example of a preferred block copolymer is Vector 6241D, sold by Dexco Polymers. It is a styrene-butadiene-styrene A-B-A triblock copolymer, with 43% by weight styrene, and a molecular weight $M_w$ of 63,000.

(d) Low Gloss Polymer

In addition to the high gloss rubber modified vinyl aromatic polymers (a), the polymeric compositions of the invention may advantageously contain relatively smaller amounts of rubber modified vinyl aromatic polymers having a reduced surface gloss relative to the high gloss polymers (a). An especially preferred low gloss polymer is a low gloss high impact polystyrene, or low gloss HIPS. Typically, the preferred low gloss HIPS will have a surface gloss at 60 degrees of less than 85%. A low gloss HIPS is characterized by higher diameter elastomeric polymer particles being dispersed in the polystyrene matrix than is the case with the high gloss HIPS. The larger particles sizes in turn lead to compositions which have greater impact strength. Preferably, the average particle diameter of the low gloss HIPS will be greater than one micron. More preferably, the diameter will be greater than two microns. A preferred low gloss HIPS has particles with an average diameter of between 2 and 8 microns. It is thus seen that the particle diameter is preferably less than 8 microns.

Thus it has been found that up to about 20%, based on the total weight of the polymeric composition, of a low gloss rubber modified polymer may be added, in order to raise the impact strength of the resulting compositions. Preferably, the amount will be less than about 10%, and more preferably less than about 6%.

Polymeric compositions with a combination of high gloss and high environmental stress crack resistance are formulated from the components (a), (b), (c), and optionally (d) above. The compatibilizing polymer (c) will be present in an amount effective to compatibilize components (a) and (b). Generally, this will be from about 1 to about 30% by total weight of components (a), (b), and (c). Preferably, the compatibilizing polymer (c) will be present at from 2 to 25 weight percent, and more preferably from about 3% to about 20% by weight, based on the total weight of components (a), (b), and (c).

The polyolefin (b) is present in an amount sufficient to raise the environmental stress crack resistance to an acceptable level. In general, this amount will be greater than 10%. Preferably the content of component (b) is about 15% or greater, and more preferably greater than or equal to about 20%. On the other hand, high levels of polyolefin (b) tend to decrease the stiffness of the final composition from its optimum level. For this reason, the level in general should be less than 50% by weight. It is preferred that the level be less than 40%. Most preferably, the level of polyolefin (b) will be less than about 35%. All percentages are percentage by weight, based on the total weight of components (a), (b), and (c).

The balance of the composition will be made up of rubber modified vinyl aromatic polymer (a). Thus, the content of (a) will range from a minimum of 30% to a maximum of about 94% by weight. A preferred range is from 50% to 88%, while the most preferred range is from 60 to 82% by weight. Again, all percentages are by weight based on the total weight of components (a), (b), and (c).

As noted above, component (d) can optionally be present at a level up to about 20%, based on the total weight of the composition of components (a), (b), (c), and (d). Component (d) is preferably present at 10% or less, and more preferably at 6% or less, the percentages again being based on the total weight of the composition of components (a), (b), (c), and (d).

Alternatively, other additives can be added to the polymeric compositions of the invention. Examples include dyes, antioxidants, mold release agents, antistatic agents, and the like.

The components (a), (b), (c), and optional other additives may be compounded by any conventional means. These compounding means are well known in the art and are described for example in Frados, ed. *Plastics Engineering Handbook,* 4th edition, chapter 29, pp. 848–858. For example, they may be compounded and extruded in a single screw brabender between 180° C. and 240° C.

Articles, including test specimens, may be molded from the compositions using conventional injection molding or compression molding techniques, such as are described in Frados, ed. *Plastics Engineering Handbook,* 4th edition, chapter 4, pp. 83–104. For example, articles may be molded in a screw type injection molding machine at a stock temperature between 180° C. and 250° C., and a mold temperature between 20° C. and 70° C.

Articles may also be made by conventional thermoforming techniques. For example, a composition comprising components (a), (b), and (c) is extruded into a thermoplastic sheet. Thereafter, the sheet is thermoformed into the desired shape according to known techniques, such as those described in Frados, ed. *Plastics Engineering Handbook,* 4th edition, chapter 12, pp. 273–325.

Advantageously, a multilayer thermoplastic composite may be provided wherein an outside layer of the composite comprises a composition of the invention described above. In one embodiment, a composition of components (a), (b), and (c) may be co-extruded with a substrate thermoplastic layer to form a co-extruded sheet. Alternatively, components (a), (b), and (c) may be extruded into a thermoplastic sheet which is subsequently laminated onto a substrate thermoplastic layer. The substrate thermoplastic layer preferably has desirably high stiffness and impact resistance, so that the resulting multilayer thermoplastic composite is stiff and impact resistant. The substrate thermoplastic layer itself may comprise more than one layer, and the multilayer thermoplastic composite may comprise additional layers, without departing from the scope of the invention.

A preferred substrate thermoplastic layer is low gloss HIPS. In that case, the high gloss compositions described above will form a gloss cap on the substrate low gloss HIPS. This is advantageous because the substrate low gloss HIPS is less expensive than the high gloss compositions and may therefore be used economically as a core layer to provide superior stiffness and impact resistance, while the gloss cap made from components (a), (b), and (c) provides superior surface gloss properties and desirable environmental stress crack resistance. A further advantage comes from the fact that the gloss cap made from components (a), (b), and (c), being itself based on HIPS or HIPS-like compounds, has enhanced adhesion to the HIPS substrate relative to that of other gloss caps made for example from polyolefins or from another high gloss thermoplastic material such as ABS.

The multilayer thermoplastic composite, in sheet form, may be thermoformed by conventional means, as described above. The resulting thermoformed articles are advantageous for use as refrigerator linings or as food packaging where a combination of high gloss and desirable environmental stress crack resistance is required.

The polymeric composition of the invention has a gloss at 60 degrees of greater than 85%, and preferably greater than 90%. The gloss at 60 degrees is measured according to ASTM D523.

The invention is also characterized by an environmental stress crack resistance measured in minutes until breakage at 1000 psi of more than about 60.

The environmental stress crack resistance is measured with the melt index strand ESCR apparatus shown in FIG. 1. A melt index strand 12 of the material to be tested is held between strand holding clamps 14 and 15. To the bottom holding clamp 15 is attached a weight 18. The diameter of the melt index strand and the mass of the weight are chosen so that the pressure on the melt index strand is 1000 psi. Into a cup 16 affixed to the melt index strand is placed a mixture of 50% by weight cottonseed oil and 50% by weight oleic acid, and the timer 22 is started. The test proceeds until the strand 12 breaks and the weight 18 falls on the micro switch 20. This event turns off the timer 22. The elapsed time in minutes between the start and the end of the test is read off the timer, and is reported as minutes until breakage at 1000 psi.

EXAMPLES

The following materials are used in the examples:

Fortiflex T-50-200 is a high density polyethylene sold by Solvay Polymers. It has a density of 0.953 g/cm$^3$$_1$ and a melt index of 2.4. The stress exponent is 1.26.

Fortiflex F-621S is a high density polyethylene sold by Solvay Polymers. It has a density of 0.953 g/cm$^3$, and a melt index of 1.1. The stress exponent is 1.22.

Dow 12065 is a high density polyethylene sold by Dow Chemical. It has a density of 0.965 g/cm$^3$, and a melt index of 0.9. The stress exponent is 1.72.

Quantum LT 6194-69 is a high density polyethylene sold by Millennium Petrochemicals, Inc. It is currently being marketed under the name Petrothene LT 6194-69. It has a density of 0.96 g/cm$^3$, and a melt index of 1.1. The stress exponent is 1.68.

HIPS-A is a high impact grade, high gloss HIPS with a bimodal particle size distribution. It has a surface gloss at 60 degrees of 93% and an Izod impact of 2.0 ft-lb./in. It is a blend of 96% of a high gloss HIPS with rubber particle size 0.2–0.8 microns, and 4% of a low gloss HIPS with rubber particle size 2–6 microns.

HIPS-B is a medium gloss HIPS. It has a surface gloss at 60 degrees of 71%, and an Izod impact of 3.2 ft-lb./in.

HIPS-C is a medium impact high gloss HIPS. The rubber particles are of diameter 0.2–0.8 microns. It has a surface gloss at 60 degrees of 96%, and an Izod impact of 1.0 ft-lb./in.

HIPS-D is a low gloss HIPS. The rubber particles have a diameter of 3–4 microns. The gloss at 60 degrees is 25%, and the Izod impact is 2 ft-lb./in.

Vector 6241D is sold by Dexco Polymers. It is a styrene-butadiene-styrene triblock copolymer, with 43% by weight styrene, and a molecular weight $M_w$ of 63,000.

The physical properties in the examples are measured using injection molded test specimens as follows:

MFR 200 .deg. C/5 kg is the melt flow rate measured according to ASTM D1238.

Izod is notched Izod impact strength, measured according to ASTM D256.

Gardner is Gardner impact strength, measured by ASTM D3029.

Vicat is Vicat softening temperature, measured by ASTM D1525.

Tensile yield, tensile break, tensile modulus, and tensile elongation are measured according to ASTM D638.

Gloss, 60 .deg. is measured on 0.125 inch thick injection molded discs according to ASTM D523. It is expressed as a percentage reflectance.

MIS-ESCR, min. 50/50 CO/OA, 1000 psi is the minutes until breakage at 1000 psi, measured according to the test procedure diagrammed in FIG. 1, when a 50/50 mixture of cottonseed oil and oleic acid is applied to the melt index strand.

Stress exponent is determined by measuring the throughput of a melt indexer at two stresses (2160 g and 6480 g loading) using the procedures of the ASTM melt index test method, and the following formula:

Stress exponent=(1/0.477)×log (wt. extruded with 6480 g wt./wt. extruded with 2160 g wt.)

In the examples below, the components were compounded in a ¾" single screw Brabender at a temperature of 200° C. Test specimens were molded from the compositions in a 28 oz. Arburg lab machine at a stock temperature of 238° C. and a mold temperature of 66° C.

Examples 1–4

These examples demonstrate the calculation of the stress exponent of polyolefin (b) from measurements of melt flow rate at two different loads, expressed in g/10 minutes according to ASTM D1238. Example 3 shows that Dow 12065, a high density polyethylene of Dow Chemical, has a stress exponent which is outside the scope of the invent on.

| Examples HPDE Grade | 1 Fortiflex T-50-200 | 2 Fortiflex F-621S | 3 Dow 12065 | 4 Quantum LT 6194-69 |
|---|---|---|---|---|
| MFR 190° C./2.16 Kg | 2.57 | 1.66 | 0.85 | 1.05 |
| MFR 190° C./6.48 Kg | 10.3 | 6.34 | 5.61 | 6.67 |
| Stress exponent | 1.26 | 1.22 | 1.72 | 1.68 |

Examples 5–9

These examples show the effect of the different polyolefins inside and outside the scope of the invention on the gloss, ESCR, and impact resistance properties of the resulting compositions.

Example 5 shows that HIPS-A has a gloss at 60 degrees of 93%, within the scope of the invention. Its ESCR is very low, at only 12 minutes until breakage at 1000 psi.

Example 6 shows that adding component (c) alone has little effect on the ESCR or gloss.

Example 7 shows a polyolefin (b) within the scope of the invention (Fortiflex T-50-200). The resulting composition has a gloss of 90%, and the ESCR has risen to 390 minutes. It is thus within the scope of the invention.

Example 8 shows that a polyolefin (b) outside the scope of the invention produces a polymeric composition of insufficient gloss to achieve the object of the invention.

Example 9 is another example of a polyolefin (b) within the scope of the invention. Note that the resulting gloss and ESCR values are within the scope of the invention.

| Example number | 5 | 6 | 7 | 8 | 9 |
|---|---|---|---|---|---|
| HIPS-A | 100 | 90 | 70 | 70 | 70 |
| Fortiflex T-50-200 | — | — | 20 | — | — |
| Dow 12065 | — | — | — | 20 | — |
| Quantum LT-6194-69 | — | — | — | — | 20 |
| Vector 6241D | — | 10 | 10 | 10 | 10 |
| MFR 200° C./5 Kg | 4.4 | 6.0 | 6.7 | 6.0 | 6.6 |
| Izod (ft-lb/in) | 2.0 | 2.7 | 5.2 | 5.1 | 5.4 |
| Gardner (in-lbs) | 265 | 320 | 379 | 344 | 368 |
| Vicat, °C. | 99 | 100 | 101 | 101 | 101 |
| Tensile Yield (psi) | 3794 | 3200 | 3133 | 3193 | 3212 |
| Tensile Break (psi) | 3271 | 3190 | 3031 | 2419 | 2717 |
| Tensile Modulus (Kpsi) | 231 | 200 | 164 | 168 | 169 |
| Tensile Elong. (%) | 27 | 41 | 46 | 41 | 46 |
| Gloss, 60° | 93 | 96 | 90 | 69 | 87 |
| MIS-ESCR, 'minutes 50/50 CO/OA, 1000 psi | 12 | 22 | 390 | 478 | 776 |

Examples 10–15

Examples 10 and 11 illustrate that if the rubber modified polymer (a) has gloss less than 85% (Ex. 10), then the resulting polymeric composition will not have high enough gloss to be within the scope of the invention (Ex. 11). Examples 12 and 13 on the other hand show the results when a high rubber modified vinyl aromatic polymer (a) within the scope of the invention is used—gloss is above 85%, and ESCR is above 60 minutes. Example 15 shows the result of using a rubber modified polymer (a) with a bimodal particle size distribution—excellent gloss and ESCR results are achieved with the use of a polyolefin (b) within the scope of the invention.

| | Example number | | | | | |
|---|---|---|---|---|---|---|
| | 10 | 11 | 12 | 13 | 14 | 15 |
| HIPS-B | 100 | 80 | — | — | — | — |
| HIPS-C | — | — | 100 | 80 | — | — |
| HIPS-A | — | — | — | — | 100 | 80 |
| Fortiflex F-621S | — | 15 | — | 15 | — | 15 |
| Vector 6241D | — | 5 | — | 5 | — | 5 |
| MFR 200° C./5 Kg | 2.9 | 3.4 | 4.4 | 5.2 | 4.7 | 5.0 |
| Izod (ft-lb/in) | 3.2 | 4.7 | 1.0 | 3.6 | 2.0 | 4.3 |
| Gardner (in-lbs) | 292 | >320 | 67 | 296 | 265 | 320 |
| Vicat, ° C. | 105 | 104 | 102 | 103 | 99 | 103 |
| Tensile Yield (psi) | 3778 | 3552 | 4718 | 3757 | 3794 | 3689 |
| Tensile Break (psi) | 3958 | 4057 | 3882 | 3828 | 3271 | 3873 |
| Tensile Modulus (Kpsi) | 234 | 186 | 238 | 204 | 231 | 204 |
| Tensile Elong (%) | 61 | 114 | 14 | 91 | 27 | 98 |
| Gloss, 60° | 71 | 55 | 97 | 98 | 93 | 98 |
| MIS-ESCR, min. 50/50 CO/OA, 1000 psi | 22 | 670 | 11 | 64 | 12 | 525 |

Examples 16–23

These examples show that up to 20% of a HIPS with particle size from 2 to 8 microns (exemplified by HIPS-D) can be added to the composition.

Examples 18 through 21 show the effect of the amount of polyolefin (b). A level of 15% is preferred to raise the environmental stress crack resistance to a desirable level, while a level of 20% is more preferred (ex. 21).

|  | Example Number | | | | | | | |
|---|---|---|---|---|---|---|---|---|
|  | 16 | 17 | 18 | 19 | 20 | 21 | 22 | 23 |
| HIPS-C | 96 | 90 | 86 | 76 | 70 | 66 | 61 | 60 |
| HIPS-D | 4 | 4 | 4 | 4 | 4 | 4 | 4 | 20 |
| Fortiflex F-621S | — | 5 | 5 | 15 | 15 | 20 | 25 | 15 |
| Vector 6241D | — | — | 5 | 5 | 10 | 10 | 10 | 5 |
| MFR 200° C./5 KG | 4.7 | 4.4 | 4.9 | 5.0 | 6.0 | 6.0 | 5.4 | 4.7 |
| Izod (ft-lb/in) | 1.9 | 1.7 | 2.5 | 4.3 | 5.4 | 6.5 | 6.5 | 2.9 |
| Gardner (in-lbs) | 267 | 24 | >320 | 320 | >320 | >320 | >320 | >320 |
| Vicat, ° C. | 101 | 102 | 101 | 103 | 102 | 102 | 103 | 103 |
| Tensile Yield (psi) | 3710 | 4280 | 3920 | 3689 | 3127 | 3106 | 3262 | 3244 |
| Tensile Break (psi) | 3361 | 3714 | 3538 | 3873 | 3367 | 3583 | 2424 | 3622 |
| Tensile Modulus (Kpsi) | 230 | 236 | 219 | 204 | 191 | 176 | 165 | 195 |
| Tensile Elong (%) | 29 | 35 | 38 | 98 | 91 | 128 | 117 | 96 |
| Gloss, 60° | 96 | 98 | 99 | 98 | 97 | 94 | 91 | 92 |
| MIS-ESCR, min. 50/50 CO/OA, 1000 psi | 12 | 15 | 19 | 510 | 485 | 2000 | 7000 | 409 |

I claim:

1. A manufactured article exhibiting an advantageous combination of high gloss and high environmental stress crack resistance, made from a polymeric composition comprising
   (a) a high gloss rubber modified vinyl aromatic polymer having a surface gloss at 60 degrees of greater than about 85%; and
   (b) a polyolefin that has a stress exponent less than 1.70, wherein the gloss at 60 degrees of the article is greater than about 85%, and the environmental stress crack resistance of the article measured in minutes until breakage at 1000 psi is more than about 60.

2. An article according to claim 1, wherein the rubber modified polymer (a) has an impact resistance of greater than 0.7 ft-lb/inch.

3. An article according to claim 2, selected from the group consisting of molded articles, thermoformed articles, thermoplastic sheets, and multilayer thermoplastic composites.

4. An article according to claim 3, wherein component (a) is a high impact polystyrene comprising a polystyrene matrix having dispersed therein particles of elastomeric polymers.

5. An article according to claim 4, wherein the elastomeric polymers are based on 1,3-dienes.

6. An article according to claim 5, wherein the elastomeric polymers are selected from the group consisting of polybutadiene, copolymers of styrene and butadiene, and mixtures thereof.

7. An article according to claim 4, wherein the particles have an average diameter of less than about one micron.

8. An article according to claim 7, wherein the particles have an average diameter of less than about 0.8 microns, and greater than about 0.2 microns.

9. An article according to claim 4, comprising the high impact polystyrene (a) having a monomodal particle size distribution.

10. An article according to claim 4, wherein the particles have a bimodal size distribution with a first maximum corresponding to particles of average diameter less than one micron, and with a second maximum corresponding to particles of average diameter greater than one micron.

11. An article according to claim 10, wherein the second maximum corresponds to particles with an average diameter of greater than 2 microns and less than 8 microns.

12. An article according to claim 11, wherein the first maximum corresponds to particles with an average diameter of greater than 0.2 microns and less than 0.8 microns.

13. An article according to claim 3, wherein polyolefin (b) comprises a copolymer of ethylene and one or more $C_3$–$C_{10}$ olefinic monomers.

14. An article according to claim 3, wherein polyolefin (b) comprises high density polyethylene of density equal to or greater than about 0.94 g/cm$^3$.

15. An article according to claim 3, wherein component (b) has a stress component which is less than or equal to about 1.40.

16. An article according to claim 15, wherein component (b) has a stress component which is less than or equal to about 1.30.

17. An article according to claim 3, further comprising a compatibilizing polymer.

18. An article according to claim 17, wherein the compatibilizing polymer is a block copolymer of vinyl aromatic monomers and diene monomers.

19. An article according to claim 18, wherein the vinyl aromatic monomer is styrene, and the diene monomer is selected from the group consisting of isoprene, butadiene, and mixtures thereof.

20. An article according to claim 19, wherein the styrene content of the compatibilizing polymer is greater than or equal to 35 weight percent, based on the total weight of monomers in the compatibilizing polymer.

21. An article according to claim 20, wherein the styrene content of the compatibilizing polymer is less than or equal to 85 weight percent, based on the total weight of monomers in the compatibilizing polymer.

22. An article according to claim 18, wherein the compatibilizing polymer is an A-B diblock copolymer.

23. An article according to claim 18, wherein the compatibilizing polymer is an A-B-A triblock copolymer.

24. An article according to claim 18, wherein the compatibilizing polymer is a star block copolymer.

25. A manufactured article exhibiting an advantageous combination of high gloss and high environmental stress crack resistance, made from a polymeric composition comprising:

(a) high impact polystyrene having a gloss at 60 degrees of greater than 85% and an impact resistance of greater than 0.7 ft-lb/inch, comprising a rubber modified polystyrene which has rubber particles with an average diameter of less than about one micron;

(b) high density polyethylene which has a density greater than or equal to about 0.94 g/cm$^3$, and which has a stress exponent less than or equal to 1.70; and (c) a compatibilizing polymer for components (a) and (b), selected from the group consisting of diblock styrene butadiene copolymers, triblock styrene butadiene copolymers, diblock styrene isoprene copolymers, triblock styrene isoprene copolymers, and mixtures thereof, wherein the gloss at 60 degrees of the article is greater than or equal to about 85%, and the environmental stress crack resistance of the article measured in minutes until breakage at 1000 psi is greater than about 60.

26. An article according to claim 25, selected from the group consisting of molded articles, thermoformed articles, thermoplastic sheets, and multilayer thermoplastic composites.

27. An article according to claim 26, wherein the stress exponent of the high density polyethylene (b) is less than or equal to about 1.40.

28. An article according to claim 27, wherein the stress exponent of the high density polyethylene (b) is less than or equal to about 1.30.

29. An article according to claim 26, further comprising a low gloss HIPS.

30. An article according to claim 29, wherein the low gloss HIPS has dispersed elastomeric polymer particles with a diameter of greater than 2 microns.

31. An article according to claim 30, wherein the low gloss HIPS is present in an amount up to 20% by weight, based on the total weight of the composition.

32. An article according to claim 31, wherein the low gloss HIPS is present in an amount up to 10% by weight, based on the total weight of the composition.

33. An article according to claim 32, wherein the low gloss HIPS is present in an amount up to 6% by weight, based on the total weight of the composition.

34. An article according to claim 26, wherein the weight percent of component (a) is from about 30 to about 94%, the weight percent of component (b) is from about 10 to about 40%, and the weight percent of component (c) is from about 1 to about 30%, all percentages being based on the total weight of the composition.

35. A multilayer thermoplastic composite, comprising (1) a substrate layer, and (2) a gloss cap layer affixed to the substrate layer, wherein the gloss cap layer (2) comprises (a) high impact polystyrene having a gloss at 60 degrees of greater than 85% and an impact resistance of greater than 0.7 ft-lb/inch, comprising a rubber modified polystyrene which has rubber particles with an average diameter of less than about one micron;

(b) high density polyethylene which has a density greater than or equal to 0.94 g/cm$^3$, and which has a stress exponent less than or equal to about 1.70; and (c) a compatibilizing polymer for components (a) and (b), selected from the group consisting of diblock styrene butadiene copolymers, triblock styrene butadiene copolymers, diblock styrene isoprene copolymers, triblock styrene isoprene copolymers, and mixtures thereof, wherein the gloss at 60 degrees of the gloss cap layer is greater than or equal to about 85%, and the environmental stress crack resistance of the gloss cap layer measured in minutes until breakage at 1000 psi is greater than about 60.

36. A multilayer thermoplastic composite according to claim 35, wherein the high density polyethylene (b) has a stress exponent of less than or equal to about 1.40.

37. A multilayer thermoplastic composite according to claim 36, wherein the high density polyethylene (b) has a stress exponent of less than or equal to about 1.30.

38. A multilayer thermoplastic composite according to claim 35, wherein the gloss cap layer (2) further comprises a low gloss HIPS.

39. A multilayer thermoplastic composite according to claim 38, wherein the low gloss HIPS has dispersed elastomeric polymer particles with a diameter of greater than 2 microns.

40. A multilayer thermoplastic composite according to claim 39, wherein the low gloss HIPS is present in an amount up to 20% by weight, based on the total weight of the composition of the gloss cap layer.

41. A multilayer thermoplastic composite according to claim 40, wherein the low gloss HIPS is present in an amount up to 10% by weight, based on the total weight of the composition of the gloss cap layer.

42. A multilayer thermoplastic composite according to claim 41, wherein the low gloss HIPS is present in an amount up to 6% by weight, based on the total weight of the composition of the gloss cap layer.

43. A multilayer thermoplastic composite according to claim 35, wherein the weight percent of component (a) is from about 30 to about 94%, the weight percent of component (b) is from about 10 to about 40%, and the weight percent of component (c) is from about 1 to about 30%, all percentages being based on the total weight of the composition of the gloss cap layer (2).

* * * * *